United States Patent [19]
Moore

[11] 3,805,922
[45] Apr. 23, 1974

[54] AIR LINE LUBRICATOR SAFETY DEVICE
[76] Inventor: Robert M. Moore, 4695 S. Jason St., Englewood, Colo. 80110
[22] Filed: Mar. 9, 1973
[21] Appl. No.: 339,833

Related U.S. Application Data
[63] Continuation-in-part of Ser. No. 290,963, Sept. 21, 1972, abandoned.

[52] U.S. Cl........ 184/55 A, 137/101.11, 184/103 A
[51] Int. Cl................................................. F16n 7/30
[58] Field of Search......... 184/1 C, 6.4, 55 R, 55 A, 184/56 A, 103 A; 261/78 A; 137/101.11, 564.5, 205.5

[56] References Cited
UNITED STATES PATENTS
2,903,091   9/1959   Goehring....................... 184/103 A
3,447,562   6/1969   Hoffman........................ 184/103 A
3,040,835   6/1962   Ahnert.............................. 184/55 A
3,651,889   3/1972   Humphrey........................ 184/55 A FOREIGN PATENTS OR APPLICATIONS
2,004,507   3/1969   France............................ 184/55 A
612,222     4/1935   Germany........................ 184/55 A Primary Examiner—Manuel A. Antonakas
Attorney, Agent, or Firm—Bertha L. MacGregor

[57] ABSTRACT

An air line lubricator safety device for automatically actuating an air actuatable member located outside of the lubricator. The air actuatable member may be a normally open air valve in an air line leading to an air operated tool, said air valve being automatically closed when the oil level in the lubricator falls below a predetermined level and thereby prevents operation of the tool, or the air actuatable member may be a signal device such as a whistle or light or other signal automatically air actuated when the oil level in the lubricator falls below a predetermined level. The safety device comprises a lubricator having an oil bowl containing oil and air under pressure, an air intake tube mounted in the oil bowl, said tube having an opening normally below the oil level in the bowl, a float movable relatively to the tube closing said tube opening when the float is supported by the oil above a predetermined level and exposing said opening when the oil level falls below said predetermined level, an air actuatable member, and means connecting the air intake tube and said air actuatable member for actuating said member.

10 Claims, 7 Drawing Figures

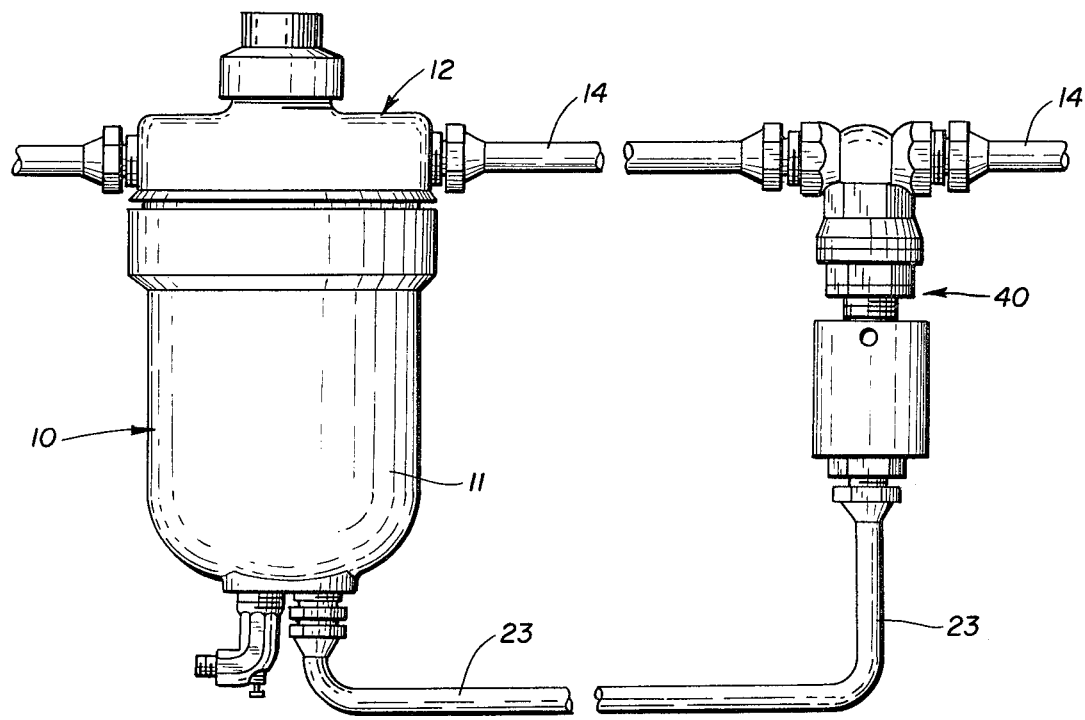
Fig.4
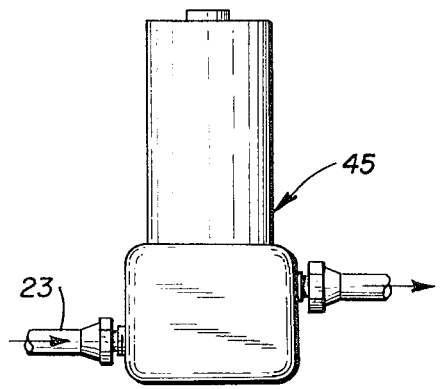
Fig.5
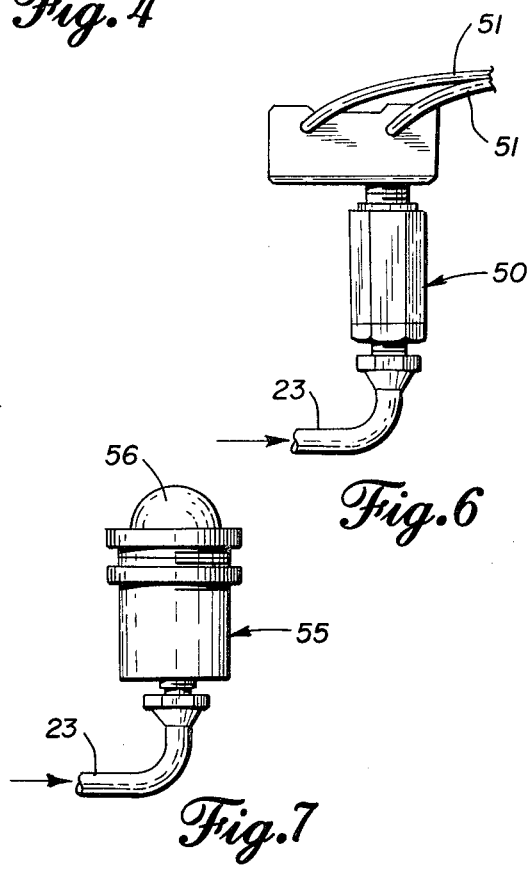
Fig.6
Fig.7

AIR LINE LUBRICATOR SAFETY DEVICE

This application is a continuation-in-part of my co-pending application Ser. No. 290,963 filed Sept. 21, 1972, Air Line Lubricator Safety Device, now abandoned.

This invention relates to a safety device for air line lubricators designed for tool maintenance. In one embodiment of the invention, the safety device prevents operation of the air operated tool when the oil supply in the lubricator falls below a predetermined level by utilizing air from the lubricator for closing a valve and automatically cutting off the pressurized air supply to the tool and thus prevents operation of and injury to the tool. In another embodiment of the invention, instead of preventing tool operation, the safety device may employ air released from the lubricator bowl when the oil supply in the lubricator falls below a predetermined level for the purpose of actuating signal devices that warn the operator that the lubricator bowl is low on lubricant or out of lubricant. Such signal devices may be a pressure operated electric switch which sounds an alarm or causes a signal light to be energized. The signal device may be a valve associated with an air line to open the line and cause a whistle to blow, or to actuate an arm to serve as a waving warning signal.

One object of the invention is to provide a safety device in a lubricator which automatically prevents operation of an air operated tool when the oil supply is exhausted or near exhausted by automatically closing a normally open air valve in the air line that supplies pressurized air to the tool. Another object is to employ the safety device in the lubricator to automatically actuate a warning signal that informs the operator that the lubricator bowl is low on lubricant.

Another object is to provide a safety device for the purposes stated which is designed for installation in existing lubricators and may also be built into new manufactures of lubricators.

Another object is to utilize the air under pressure in the lubricator oil bowl as the means for either actuating an air valve in the air line to cut off the air supply to the tool when the oil level in the lubricator bowl has been lowered to a predetermined level, or for utilizing the air under pressure in the air line from the lubricator bowl to actuate air operated signal or warning devices when the oil level in the bowl has been lowered to a predetermined level. It will be understood that if it is desired to actuate a signal such as an alarm, light or whistle, the safety device of my invention may be employed for that purpose without actuating the valve that controls passage of pressurized air to the tool being operated by the air.

In the drawings:

FIG. 4 is an elevational view of the air line lubricator safety device showing the embodiment of the invention wherein the lubricator bowl air line is connected to a normally open air valve for the purpose of automatically preventing operation of an air operated tool when the oil supply in the lubricator is below a predetermined level.

FIG. 5 is an elevational view of a whistle actuating device that may be connected to the air line leading from the lubricator bowl for the purpose of automatically giving a signal when the oil supply is below a predetermined level in the bowl, when it is not desired to stop the operation of the tool by the means shown in FIG. 4.

FIG. 6 is an elevational view of an air actuator for electric switches that may be substituted for the whistle actuating device of FIG. 5 for the purpose of actuating a switch controlling a selected type of signal device.

FIG. 7 is an elevational view of another device that may be connected to the lubricator air line to provide a visual pneumatic indicator or signal.

Figure 1:
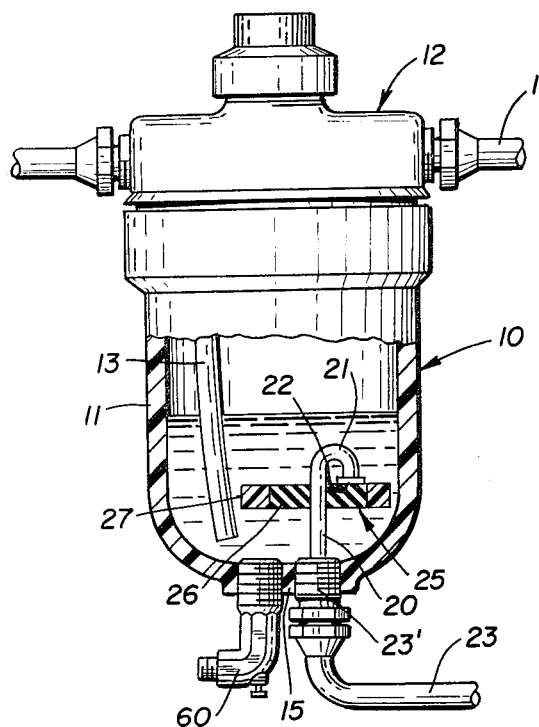
FIG. 1 is an elevational view, partly in section, of an air line lubricator safety device embodying the invention, showing the oil level in the lubricator bowl above the float which closes the air intake tube.

In the embodiment of the invention shown in the drawing, the lubricator 10 comprises an oil holding bowl 11, head 12, and oil feeder tube 13 through which oil is fed to an air line 14 in mist form by a venturi nozzle (not shown) within the head 12. The lower end of the bowl is closed by a plug 15. The named elements are parts of conventional air line lubricators used in maintenance of air operated tools.

Figure 2:
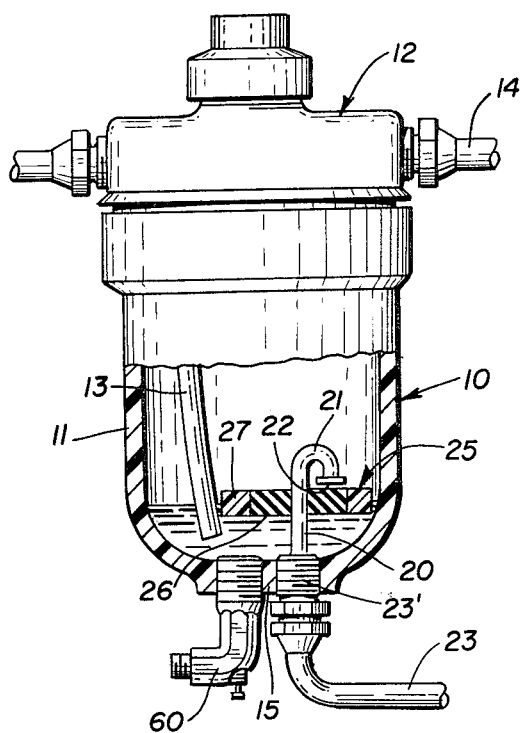
FIG. 2 is an elevational view, partly in section, of the mechanism shown in FIG. 1, showing the oil level in the lubricator bowl at a lower level and the float below the downturned end of the air intake tube to expose the opening in said end and allow pressurized air in the bowl to enter the air intake tube.

The safety device of my invention shown in FIGS. 1 and 2 comprises a pressurized air intake tube 20 located in the oil bowl 11, within the oil contents, its upper end 21 being curved and terminates in an opening 22. The lower end of the air intake tube 20 extends through the plug 15 and is connected to a flexible conduit 23 which is the lubricator pressure air line that actuates the means for automatically controlling the air supply to the tool or for automatically controlling one of the signal devices described herein.

A float 25, in the form of a circular disc, has a soft rubber center 26 and a firmer peripheral portion 27, and is slidably mounted on the air tube 20. While the oil in the bowl 11 supports the float in its uppermost position, the top surface of the soft rubber center 26 contacts the end 21 of the tube 20 and closes the opening 22, as shown in FIG. 1. When the oil in the bowl 11 has been consumed sufficiently to lower the oil level so the float top surface is slightly below the end 21 of the tube 20, as shown in FIG. 2, the air in the bowl 11 above the oil enters the tube 20 through the opening 22. This air normally is under pressure in the operation of the lubricator. Thus the pressurized air that enters the opening 22 passes through the intake tube 20 and 23 to actuate one of the means shown in FIGS. 4–7 as hereinafter explained.

Figure 3:
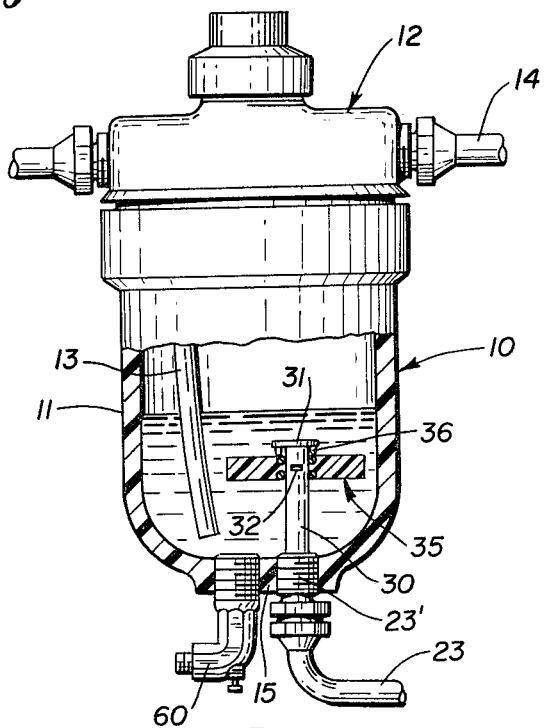
FIG. 3 is an elevational view, partly in section, of a modified form of air intake tube, showing the oil level in the lubricator bowl above the float which closes the air intake tube.

A modification of the air intake tube 20 is shown in FIG. 3. In this modification, the air intake tube 30 is straight, its upper end 31 being closed, and an opening 32 is located in the tube below the upper end. The tube 30 is connected at its lower end to the flexible conduit 23 heretofore described. A float 35 is slidably mounted on the tube 30 on O-rings, and a nylon washer 36 surrounds the tube above the float.

When the oil in the bowl 11 supports the float 35 in its uppermost position, the top surface of the float is above the opening 32 and the body of the float closes the opening. When the oil in the bowl 11 has been consumed sufficiently to lower the oil level so the float top surface is below the opening 32, the air in the bowl above the oil enters the tube 30 through the opening 32. As heretofore stated, the air in the bowl normally is under pressure in the operation of the lubricator, and thus the air that enters the opening 32 passes under pressure through the intake tube 30 and conduit 23.

The whistle actuating device 45 may be a commercially available construction such as the ROTORAM (Reg. T.M.) 3 way Single Pilot Spring Return which receives air under pressure from the lubricator bowl 10 through conduit 23 and serves to activate a whistle (not shown).

The air actuator for an electric switch, shown in FIG. 6, designated 50, provided with electrical leads 51, may activate a light bulb (not shown) that serves as a signal. This device is known commercially as Mead Fluid Dynamics MPE—BA + BZ.

The visual pneumatic indicator 55 shown in FIG. 7 is a non-electrical indicator employing fluorescent means for providing a constantly visible signal 56 actuated by the air pressure in the conduit 23 from the lubricator bowl. This device is known commercially as Mead Visual Pneumatic Indicator LT-10.

The core 60 functions to drain any water that may be present below the oil supply in the bowl 11.

When the conduit 23 is connected to the normally open valve 40, and the oil in the bowl 11 has reached a level below the predetermined level, air passes from the bowl 11 to the valve 40 and automatically closes the normally open valve 40, and prevents passage of air to the tool operated thereby through line 14. Release of pressure leading to the valve 40 restores the valve 40 to its normally open state and allows pressurized air to pass through the air line 14 to the tool operated thereby. When the conduit 23 is connected to one of the signal activating devices of FIGS. 5, 6 and 7, and the oil in the bowl 11 has reached a level below the predetermined level, air passes through line 23 to the signal device. The conduit 23 may be used to convey pressurized air to a normally closed vlave in air line 14 for the purpose of opening the valve and thereby actuating a whistle or other signal requiring more air volume than that conveyed by the conduit 23 to the signals heretofore described.

I claim:

1. An air line lubricator safety device for automatically actuating an air actuable member located outside of the lubricator comprising
   a. a lubricator having an oil bowl containing oil and pressurized air and means for feeding the oil to an air line leading to an air operated tool,
   b. an air intake tube mounted in the oil bowl, said tube having an opening normally below the oil level in the bowl,
   c. a float movable relatively to the tube, said float closing the tube opening when the float is supported by the oil above a predetermined level and exposing said opening when the oil level falls below said predetermined level,
   d. an air actuatable member located outside of the lubricator, and
   e. means connecting the air intake tube and said air actuatable member for actuating said member when the oil level falls below said predetermined level.

2. The device defined by claim 1, in which the air actuatable member is a normally open air valve in the air line leading to the air operated tool, said air valve being closed by air in the means connecting the air intake tube and said air valve.

3. The device defined by claim 1, in which the air actuatable member is a signal device.

4. The device defined by claim 3, in which the signal device is an air operated whistle.

5. The device defined by claim 3, in which the signal device is an air operated light.

6. The device defined by claim 1, in which the air intake tube has a curved upper portion terminating in a downturned end, and the opening in the tube is located in said downturned end, said opening being closed by contact with the upper surface of the float when the float is in its uppermost position.

7. The device defined by claim 1, in which the air intake tube has a closed upper end and the opening in the tube is located below said closed upper end.

8. In combination with an air line lubricator comprising an oil bowl containing oil and pressurized air, and means for feeding the oil in mist form to an air line leading to an air operated tool, a safety device for automatically preventing operation of the air operated tool by cutting off the supply of air to the tool comprising a. an air intake tube mounted in the oil bowl, said tube having an opening normally below the oil level in the bowl,
   b. a float movable relatively to the tube, said float closing the tube opening when the float is supported by the oil above a predetermined level and exposing said opening when the oil level is below said predetermined level,
   c. a normally open air valve in the air line leading to the air operated tool, and
   d. means connecting the air intake tube and the normally open air valve conveying pressurized air from the lubricator oil bowl through said tube to said valve to thereby automatically close the air valve and cut off the air supply in the air line when the opening in the air intake tube is exposed.

9. The device defined by claim 8, in which the air intake tube has a curved upper portion terminating in a downturned end and the opening in said tube is located in said end, said opening being closed by contact with the upper surface of the float when the float is in its uppermost position.

10. The device defined by claim 9, in which the float has a resilient central portion contacted by the open end of the air intake tube surrounded by a harder peripheral portion.

* * * * *